(12) United States Patent
Matsugu et al.

(10) Patent No.: US 6,621,921 B1
(45) Date of Patent: *Sep. 16, 2003

(54) IMAGE PROCESSING APPARATUS

(75) Inventors: Masakazu Matsugu, Chiba (JP); Katsumi Iijima, Hachiouji (JP); Kotaro Yano, Yokohama (JP); Sunao Kurahashi, Kawasaki (JP); Toshiaki Kondo, Fujisawa (JP); Motohiro Ishikawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/767,018

(22) Filed: Dec. 16, 1996

(30) Foreign Application Priority Data

Dec. 19, 1995 (JP) .............................. 7-330505

(51) Int. Cl.[7] .............................. G06K 9/00; G06K 9/66
(52) U.S. Cl. ........................................ 382/154; 382/190
(58) Field of Search ................................ 382/154, 153, 382/104, 108, 190, 195, 199, 201, 203, 243, 287, 278; 348/36–38, 42, 49, 50, 46–48; 358/91–92, 88, 142–146

(56) References Cited

U.S. PATENT DOCUMENTS 4,583,117 A * 4/1986 Lipton et al. .................. 358/92
4,956,705 A * 9/1990 Wright ........................ 358/88
5,394,520 A * 2/1995 Hall ............................ 395/135

FOREIGN PATENT DOCUMENTS

| JP | 5303629 | 11/1993 | ........... G06F/15/62 |
| JP | 6208610 | 7/1994 | ........... G06F/15/62 |
| JP | 6241731 | 9/1994 | ........... G01B/11/00 |
| JP | 6259536 | 9/1994 | ........... G06F/15/64 |

OTHER PUBLICATIONS

Roger Y. Tsai (A Versatile Camera Calibration Technique for High–Accuracy 3D Machine Vision Metrology Using Off–the shelf TV Cameras and Lenses, IEEE Journal of Robotics and Automation, vol. RA–3, No. 4, pp. 323–344), Aug. 1987.*

"Calibration of Stereo Cameras Using a Non–Linear Distortion Model", J. Weng et al., IEEE Proceedings of International Conference On Pattern Recognition, 1990, pp. 246–253.

"A Versatile Camera Calibration Technique For High–Accuracy 3D Machine Vision Metrology Using Off–The–Shelf TV Cameras and Lenses", R. Tsai, IEEE Journal of Robotics and Automation, vol. RA–3, pp. 323–344, 1987.

* cited by examiner

Primary Examiner—Andrew W. Johns
Assistant Examiner—Duy M. Dang
(74) Attorney, Agent, or Firm—Fitzpatrick, Cella, Harper & Scinto

(57) ABSTRACT

An image processing apparatus in which a plurality of images obtained by photographing a three-dimensional object from a plurality of viewpoints are integrated by using image-pickup parameters such as position, pose, focal lengths, and aberration information of a camera at these viewpoints, thereby integrating shapes at arbitrary viewpoints of the three-dimensional object.

23 Claims, 15 Drawing Sheets

FIG. 6

HEADER SECTION

| SCREEN NUMBER 1 |
| --- |
| IMAGE-PICKUP POSITION (X, Y, Z) |
| POSE (α, β, γ) |
| FOCAL DISTANCE f |
| IMAGE DATA ADDRESS (OR THE NUMBER OF BITS) |
| AUXILIARY INFORMATION |

| SCREEN NUMBER 2 |
| --- |
| IMAGE-PICKUP POSITION (X, Y, Z) |
| POSE (α, β, γ) |
| FOCAL DISTANCE f |
| IMAGE DATA ADDRESS (OR THE NUMBER OF BITS) |
| AUXILIARY INFORMATION |

·
·
·
·

IMAGE DATA SECTION

| IMAGE DATA OF SCREEN NUMBER 1 |
| --- |
| IMAGE DATA OF SCREEN NUMBER 2 |
| IMAGE DATA OF SCREEN NUMBER 3 |
| · · · · |

FIG. 7

| SCREEN NUMBER 1 |
| --- |
| IMAGE-PICKUP POSITION (X, Y, Z) |
| POSE (α, β, γ) |
| FOCAL DISTANCE f |
| IMAGE DATA ADDRESS (OR THE NUMBER OF BITS) |
| AUXILIARY INFORMATION |
| IMAGE DATA OF SCREEN NUMBER 1 |

| SCREEN NUMBER 2 |
| --- |
| IMAGE-PICKUP POSITION (X, Y, Z) |
| POSE (α, β, γ) |
| FOCAL DISTANCE f |
| IMAGE DATA ADDRESS (OR THE NUMBER OF BITS) |
| AUXILIARY INFORMATION |
| IMAGE DATA OF SCREEN NUMBER 2 |

.
.
.
.

IMAGE PROCESSING APPARATUS

BACKGROUND OF THE INVENTION

1. Field of the Invention

The present invention relates to an image measuring method for using images from a plurality of viewpoints to simply and accurately extract image-pickup parameters in photographing an object, e.g., the pose, position, base length, vergence angle, focal length, and aberration information of a camera, and an image processing apparatus for measuring the three-dimensional shape of an object on the basis of image-pickup parameters to display the three-dimensional shape.

2. Description of the Related Art

A conventional method of measuring three-dimensional shape data of an object from an image, using a stereo measuring method by a binocular camera is known, as described in the "Image Processing Handbook" edited by Onoue, et al, Shokodo, 1987. A method of extracting relative positions (parallel movement amount and rotational movement amount) of all shape data of the object and a method of integrating the relative positions, which methods are based on the above stereo measuring method, are disclosed in Japanese Unexamined Patent Publication Nos. 5-303629 and 6-208610, the Institute of Electronics Information and Communication Engineers paper D-II (Vol. J75-D-II, pp. 737–748, 1992).

According to these methods, the relative positions of a plurality of partial shape data are calculated by using only the image of an object so as to calculate a whole three-dimensional shape without directly measuring the relative positions of the object and a camera by sequentially connecting the partial shape data to the camera. A method in which the camera has a pose detection sensor arranged thereon to use pose data and image data is disclosed in Japanese Unexamined Patent Publication No. 6-241731. In addition, a method of calibrating the three-dimensional position and pose of an image-pickup means by image measurement is disclosed in Japanese Unexamined Patent Publication No. 6-259536.

However, of the above prior art, the method disclosed in Japanese Unexamined Patent Publication Nos. 5-303629 and 6-208610, the Institute of Electronics Information and Communication Engineers paper D-II (Vol. J75-D-II, pp. 737–748, 1992) cannot always accurately calculate the relative positions between the camera position and the partial shapes without measuring the shape of the object and a pattern on the object surface, and the following problems arise. That is, errors occurring in integrating shape data are accumulated, and a calculation amount becomes large.

According to the method disclosed in Japanese Unexamined Patent Publication No. 6-241731, since parameters other than the pose of the camera are obtained on the basis of the image data, the same problems as described above arise. In any example, the base length, vergence angle, focal length, distortion, and aberration information of the camera must be accurately calibrated in advance. Therefore, when an object is photographed, the position and pose of the camera, which parameters are inherent in the camera cannot be adjusted.

In Japanese Unexamined Patent Publication No. 6-259536, the following problems arises. That is, accuracy and calculation stability are poor because an image at one viewpoint position is used, or the same problems as described in the prior art arise when the method is applied to three-dimensional shape measurement because the focal length of the image-pickup means is not extracted.

SUMMARY OF THE INVENTION

The present invention has been made to solve the above problems of the prior art, and has as its object to provide an image measuring method and apparatus capable of easily extracting an image-pickup parameter at a high accuracy by inputting an object image, and measuring the image.

Therefore, according to a preferred embodiment of the present invention, there is disclosed an image processing method and apparatus characterized in that, on the basis of images from a plurality of viewpoint positions including a known pattern and an object, image-pickup parameters of the image are extracted.

According to another preferred embodiment of the present invention, there is disclosed an image measuring method and apparatus characterized in that a pattern having features whose positional relationship is known is defined as a first object, and a predetermined object is defined as a second object, and image-pickup parameters are extracted on the basis of images from a plurality of viewpoint positions of the two objects.

It is another object of the present invention to measure a three-dimensional shape at a high accuracy with a simple arrangement.

In order to achieve the above objects, according to still another preferred embodiment of the present invention, there is disclosed an image measuring method and apparatus characterized by input means for inputting unknown object images obtained by viewing, at a plurality of viewpoint positions, a first object having features whose positional relationship is known and a second object having a three-dimensional shape which is at least partially unknown; image-pickup parameter extracting means for extracting image-pickup parameters corresponding to the object images; three-dimensional shape information extracting means for extracting three-dimensional shape information of the second object; recording means for recording the three-dimensional shape information; and image display means for displaying an image.

According to still another preferred embodiment of the present invention, there is disclosed an image measuring method and apparatus characterized by image inputting means for inputting unknown object images obtained by viewing, at a plurality of viewpoint positions, a first object having features whose positional relationship is known and a predetermined second object; means for extracting image-pickup parameters corresponding to the object images; image recording means for recording the object images; image-pickup parameter recording means for recording parameters corresponding to the object images; and image display means for displaying an image.

The other objects and characteristic features of the present invention are understood with reference to the following specification and drawings.

BRIEF DESCRIPTION OF THE DRAWINGS

FIG. 6 is a view for describing a recording format of an image-pickup parameter corresponding to image data.

FIG. 7 is a view for describing a recording format of an image-pickup parameter corresponding to image data.

DESCRIPTION OF THE PREFERRED EMBODIMENTS

Figure 1A:
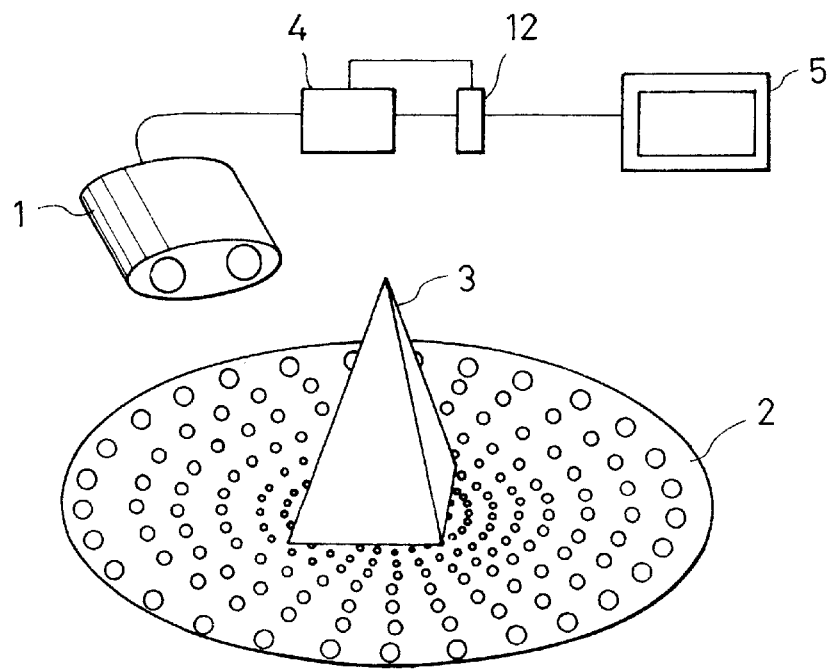
FIG. 1A is a view showing the arrangement of Embodiment 1.

In order to achieve the above objects, according to an embodiment of the present invention, an image measuring method is characterized in that, on the basis of images from a plurality of viewpoint positions including a known pattern and an object, image-pickup parameters of the images are extracted. For this reason, required parameters can be directly measured at a high accuracy from the image without recording image-pickup parameters including the position and pose of an image-pickup means in photographing the object.

According to another embodiment of the present invention, an image measuring method is characterized in that a pattern having features whose positional relationship is known is defined as a first object, and a predetermined object is defined as a second object, and image-pickup parameters are extracted on the basis of images from a plurality of viewpoint positions of the two objects. For this reason, the positional relationship between an image-pickup means and the first and second objects and the image-pickup parameters in picking up an image are measured on the basis of only the image.

According to still another embodiment of the present invention, an image measuring method is characterized in that the known pattern is present on an object whose shape is at least partially known. For this reason, even if another object having a known pattern is always prepared, image-pickup parameters are measured at a high accuracy.

According to still another embodiment of the present invention, an image measuring apparatus is characterized by: input means for inputting unknown object images obtained by viewing, at a plurality of viewpoint positions, a first object having features whose positional relationship is known and a second object having a three-dimensional shape which is at least partially unknown; image-pickup parameter extracting means for extracting image-pickup parameters corresponding to the object images; three-dimensional shape information extracting means for extracting three-dimensional shape information of the second object; recording means for recording the three-dimensional shape information; and image display means. For this reason, even if the image-pickup parameters are changed by the viewpoint positions, types of objects, illumination conditions, and the like, estimation of parameters, especially, estimation of the pose and position of an image-pickup means, are performed at a high accuracy on the basis of the input images, and simple and accurate three-dimensional information is extracted.

According to still another embodiment of the present invention, an image measuring apparatus is characterized in that input means is constituted by image-pickup means and storage means for storing an image from the image-pickup means. For this reason, when only object images from a plurality of viewpoint positions including a known pattern are picked up in advance, extraction of image-pickup parameters and extraction of three-dimensional shape information is performed as post-process.

According to still another embodiment of the present invention, an image measuring apparatus is characterized in that three-dimensional shape extracting means is constituted by reference coordinate system setting means having a predetermined point on the first object as an origin and a three-dimensional shape extracting means for the second object in the reference coordinate system. For this reason, a plurality of partial shapes obtained by photographing the same object at different anglesa plurality of times is integrated at a high accuracy.

According to still another embodiment of the present invention, an image measuring method is characterized in that the image-pickup parameters include at least one of the position, pose, focal length, and aberration information of the image-pickup means. For this reason, extraction of highly accurate three-dimensional shape information and generation of an object image from an arbitrary viewpoint position is easily performed.

According to still another embodiment of the present invention, an image measuring apparatus is characterized in that the image-pickup means includes a plurality of optical path means, at least one imaging means, and photoelectric conversion means. For this reason, image pickup conditions of image input for extracting three-dimensional shape data is stably controlled.

According to still another embodiment of the present invention, an image measuring apparatus is characterized in that the image-pickup means is a binocular camera having at least one of base length adjusting means, vergence angle adjusting means, and focal length adjusting means. For this reason, a known pattern and an object are photographed under optimum image pickup conditions, so that three-dimensional shapes obtained at different viewpoint positions are integrated at a high accuracy.

According to still another embodiment of the present invention, an image measuring apparatus is characterized by: input means for inputting unknown object images obtained by viewing, at a plurality of viewpoint positions, a firstobject having features whose positional relationship is known and a predetermined second object; image-pickup parameter extracting means for extracting image-pickup parameters corresponding to the object images; two-dimensional image recording means for the second object; means for recording image-pickup parameters corresponding to the two-dimensional image of the second object; and image display means. For this reason, simple and smooth reproduction or synthesization of an object image viewed from an arbitrary viewpoint position is performed by using only input image data.

According to still another embodiment of the present invention, an image measuring method is characterized in that the known pattern is constituted by a plurality of patterns respectively having two-dimensional features which are different from each other. For this reason, the position of a feature point is calculated on the basis of an image, and a process of extracting stable and high-accurate image-pickup parameters and a three-dimensional shape data is performed.

According to still another embodiment of the present invention, an image measuring apparatus is characterized in that the image-pickup means has two eyes whose fixed focal lengths are different from each other, one eye is used to acquire the first object image, and the other eye is used to acquire the second object image. For this reason, an error of image-pickup parameters or three-dimensional shape data caused by one blurred image obtained when an unknown-shape object and a known pattern are photographed within the same field of view is suppressed.

According to still another embodiment of the present invention, an image measuring apparatus is characterized in that the first object is constituted by arranging light-emitting elements. For this reason, image-pickup parameters and three-dimensional shape data are extracted at a higher accuracy.

Embodiments of the present invention are described in detail below with reference to the accompanying drawings.

Embodiment 1

FIG. 1A is a view showing the basic arrangement of this embodiment. Reference numeral 1 denotes a binocular camera which functions as an image-pickup means; 2, a planar object having a known pattern; 3, an object which is placed on the planar object 2 and whose three-dimensional shape is to be measured; 4, an image processing means; 5, a monitor for an image from the binocular camera 1; and 12, a shape data storage means.

Figure 1B:
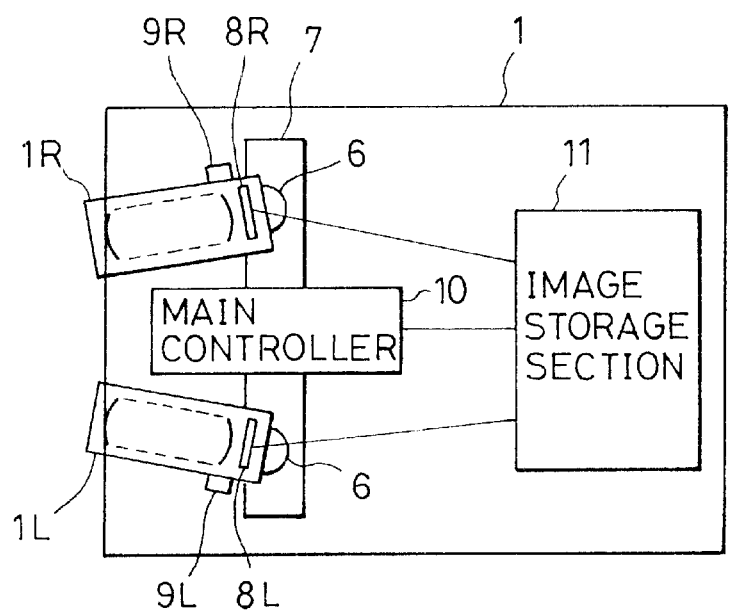
FIG. 1B is a view showing the arrangement of an image-pickup means.

The image-pickup means 1, as shown in FIG. 1B, basically has left and right cameras $1_L$ and $1_R$, an optical axis direction adjusting means. (vergence angle adjusting means) 6 for the left and right cameras $1_L$ and $1_R$, a base length (e.g., distance between the main point positions of the imaging systems of the left and right cameras $1_L$ and $1_R$) adjusting means 7, photoelectric transforming means $8_L$ and $8_R$, focal length adjusting means $9_L$ and $9_R$, a main controller 10, and an image storage unit 11 having an A/D converter function. The image-pickup means may have a known blur correcting mechanism (not shown) for correcting the flow and blur of an image by unstably handling the image-pickup means, to stabilize the image.

A measurer holds the binocular camera 1 and photographs the object 3 at a plurality of positions while checking the images of the planar object 2 and the three-dimensional shape object 3 with the monitor 5. Note that the image processing means 4 may be built in the image-pickup means 1.

Figure 2A:
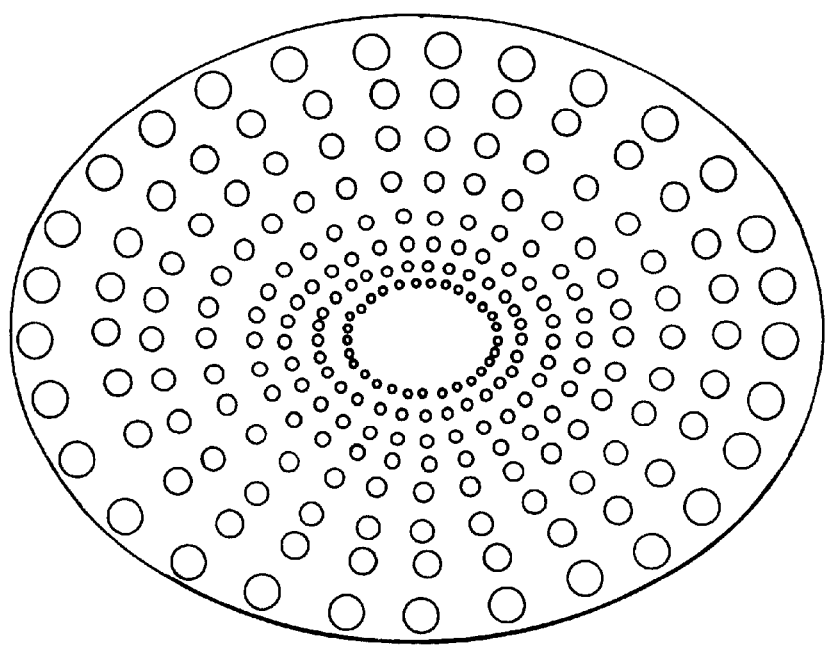
FIGS. 2A and 2B are views for describing known patterns used in this embodiment.
Figure 2B:
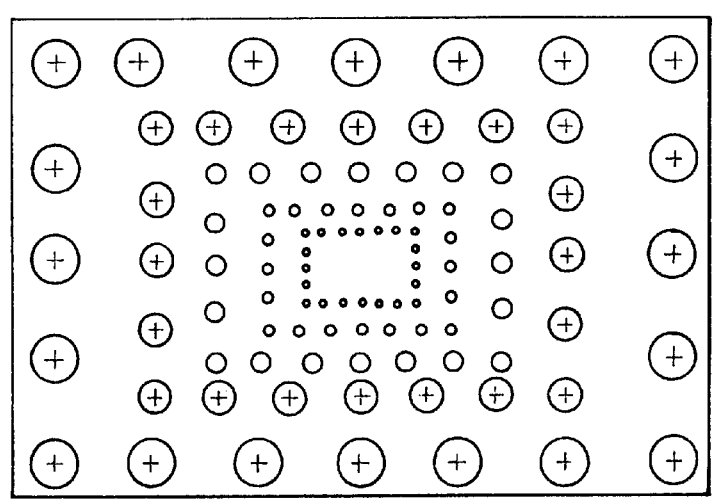

FIGS. 2A and 2B and FIGS. 3A and 3B show patterns on the planar object 2 as used in this embodiment. In the pattern in FIG. 2A, feature points $P_1$, $P_2$, $P_3$, . . . are colored dot patterns respectively having different hues, and are arranged at predetermined distribution density to form a plurality of concentric circles. As a modification of the pattern of this type, a pattern in which dots are arranged to form ellipses which have the same center and different long-axis sizes and different short-axis sizes may be used. In FIG. 2A, the sizes of dots change in the radial direction, the dots on the same cycle have the same brightness (but different hues). This pattern is not limited to the above arrangement, and the sizes, brightness, and hues of dots may be arbitrarily determined. For this reason, it is satisfactory that the dots have the different attributes, respectively. In FIG. 2B, a colored dot pattern similar to that in FIG. 2A is arranged at a predetermined distribution density on rectangles having the same centroid and different sizes. As a modification of the pattern of this type, a pattern in which dots are arranged on polygons having the same centroid and different sizes may be used.

Figure 3A:
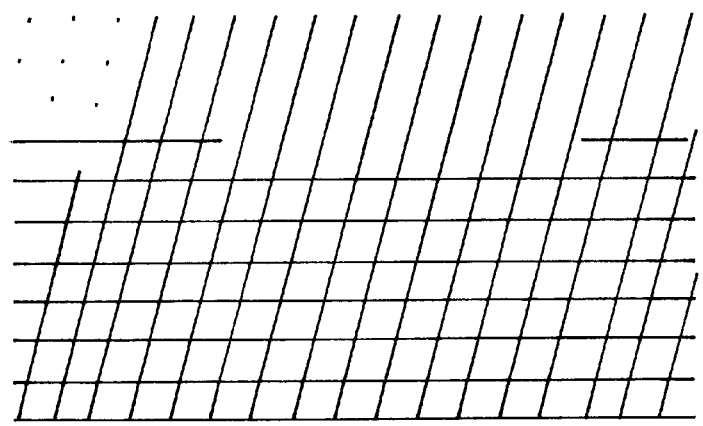
FIGS. 3A and 3B are views for describing known patterns used in this embodiment.
Figure 3B:
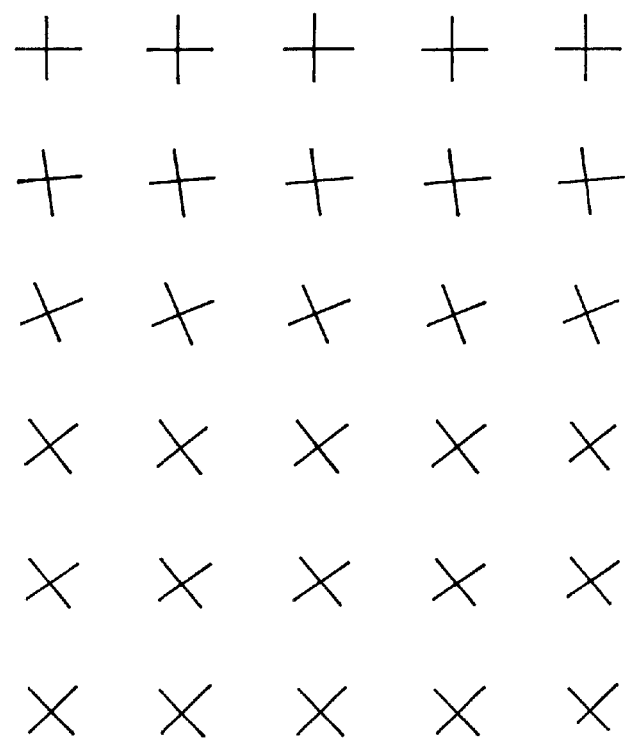

FIG. 3A shows a grating pattern having a predetermined pitch and a predetermined cross angle. In this pattern, at least one of the brightnesses, hues, and saturations of respective lines are different from each other. In FIG. 3A, each crossing point serves as a feature point. FIG. 3B shows a pattern in which X-shaped cross patterns having different hues are arranged on the grating similar to the grating pattern in FIG. 3A. In addition, two-dimensional pattern elements (e.g., L-shaped corner elements having different directions and different cross angles, characters, or the like) may be arranged at a predetermined distribution density on a grating, rectangles, concentric circles, or the like. The above patterns may be constituted such that light-emitting elements are arranged in the patterns.

As described above, as a known pattern, a pattern having features whose positional relationship (relative coordinate) is known and which have different colors such that the features are easily identified on an image, or a pattern including different two-dimensional pattern elements is especially preferable. A reference orthogonal coordinate system is defined as follows. That is, for example, two adjacent feature points observed when the first image including the images of the objects 2 and 3 is picked up by using the binocular camera 1 are selected, a straight line extending from one (origin) of the two feature points to the other is defined as an X axis, a Y axis is set in the plane of the planar object, and a Z axis is set to be perpendicular to the X and Y axes and to be a right-hand system. It is assumed that the positions of the feature points $P_1$, $P_2$, . . . are represented by $(X_1, Y_1, 0)$, $(X_2, Y_2, 0)$, . . . .

Figure 15:
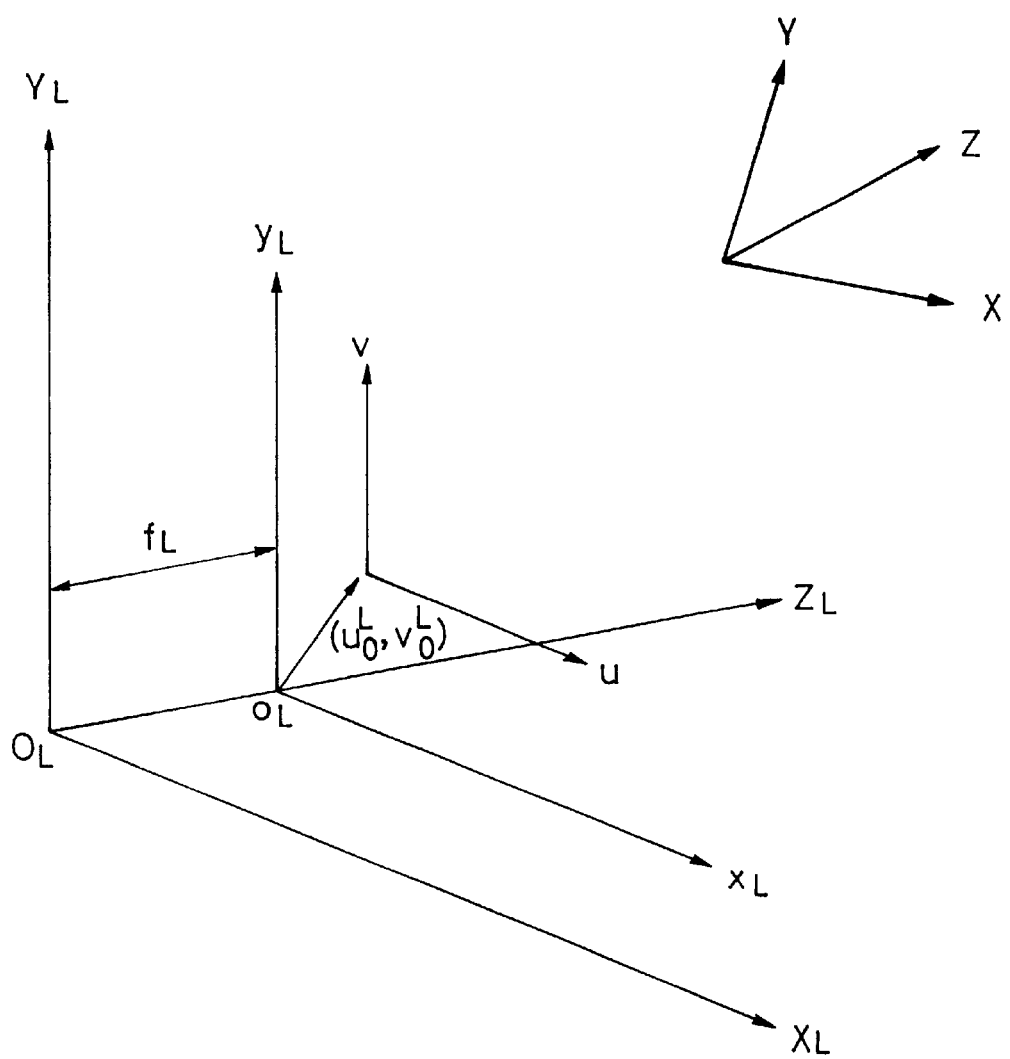
FIG. 15 is a view for describing a camera coordinate system.

Image-pickup parameters are described below. The focal lengths of the right and left cameras are represented by $f_L$ and $f_R$, respectively, a base length is represented by B, and Euler angles expressing the relative pose of the right and left cameras are represented by $\alpha_0$, $\beta_0$, and $\gamma_0$, respectively. The horizontal and vertical direction coordinates of an in-image optical axis center position of the left camera are represented by $u_0^L$ and $v_0^L$, respectively, and the horizontal and vertical direction coordinates of the right camera are represented by $u_0^R$ and $u_0^R$, respectively. FIG. 15 is a view for explaining a left camera coordinate system $(X_L, Y_L, Z_L)$. An origin $O_L$ is a main point in a perspective coordinate system, $(x_L, y_L)$ is an orthogonal coordinate system on a sensor plane, and (u, v) is an image frame coordinate system on the coordinate system $(x_L, y_L)$. The position of an origin O of image frame coordinate system is given by $(u_0^L, v_0^L)$. The same parameters as described above are set in the right camera coordinate system $(X_R, Y_R, Z_R)$. Coordinate conversion from a reference coordinate system $P=(X, Y, Z)^T$ to the left camera coordinate system $C_L=(X_L, Y_L, Z_L)$, and coordinate conversion to the right camera coordinate system $C_R=(X_R, Y_R, Z_R)$ are given by the following equations:

$$C_L = R_L P + T_L \quad (1)$$

$$C_R = R_o(R_L P + T_L) + T_o \quad (2)$$

where $R_L$ and $T_L$ are given by the following equations:

$$R_L = \begin{pmatrix} \cos\beta_L & 0 & -\sin\beta_L \\ 0 & 1 & 0 \\ \sin\beta_L & 0 & \cos\beta_L \end{pmatrix} \begin{pmatrix} \cos\alpha_L & \sin\alpha_L & 0 \\ -\sin\alpha_L & \cos\alpha_L & 0 \\ 0 & 0 & 1 \end{pmatrix} \begin{pmatrix} 1 & 0 & 0 \\ 0 & \cos\gamma_L & \sin\gamma_L \\ 0 & -\sin\gamma_L & \cos\gamma_L \end{pmatrix}$$

$$T_L = (T_X^L, T_Y^L, T_Z^L)^T$$

$\alpha_L$, $\beta_L$, and $\gamma_L$ are Euler angles expressing the pose of the left camera coordinate system with respect to the reference coordinate system, and $T_L$ is a translation vector for giving the origin of the left camera coordinate system. The difference between $T_L$ and $T_R=(T_X^R, T_Y^R, T_Z^R)$ which is determined like $T_L$, i.e., the absolute value of $T_0 = T_R - T_L$, gives a base length ($B = |T_0|$).

When the on-image position of a point obtained by projecting or imaging a point in $(X_L, Y_L, Z_L)$ onto the sensor of the left camera is given by $(u^L, v^L)$ on the left camera coordinate system, $(u^L, v^L)$ is generally given by the following equation:

$$\begin{pmatrix} u^L \\ v^L \end{pmatrix} = \frac{f_L}{Z_L} \begin{pmatrix} k_u & X_L \\ k_v & Y_L \end{pmatrix} + \begin{pmatrix} u_0^L \\ v_0^L \end{pmatrix} \quad (3)$$

where $k_u$ and $k_v$ are scaling factors determined by a pixel size. The point $(u^R, v^R)$ corresponding to the right camera is given in the same manner as described above by using the equation corresponding to the right camera.

Since the feature point coordinates $(X_1, Y_1, Z_1)$, $(X_2, Y_2, Z_2)$, ... are known, a processing method of estimating the image-pickup parameters by using the measurement results of a plurality of feature points, i.e., $(u_1^L, v_1^L), (u_2^L, v_2^L), \ldots,$ and $(u_1^R, v_1^R), (v_2^R, v_2^R), \ldots$ will be described below. $0_3 = (0, 0, 0)^T$ is set, and matrixes $M_L$ and $M_R$ having unknown image-pickup parameters as elements are given by the following equations:

$$M_L = \begin{pmatrix} k_u f_L & 0 & 0 & u_0^L \\ 0 & k_u f_L & 0 & v_0^L \\ 0 & 0 & 1 & 0 \end{pmatrix} \begin{pmatrix} R_L & T_L \\ 0_3^T & 1 \end{pmatrix}$$

$$M_R = \begin{pmatrix} k_u f_R & 0 & 0 & u_0^R \\ 0 & k_u f_R & 0 & v_0^R \\ 0 & 0 & 1 & 0 \end{pmatrix} \begin{pmatrix} R_0 R_L & R_0 T_L + T_0 \\ 0_3^T & 1 \end{pmatrix}$$

In the reference coordinate system, the on-image positions $U_a^L = (u_a^L, v_a^L)^T$ and $U_a^R = (u_a^R, v_a^R)^T$ of the left and right cameras at a feature point in $A = (X_a, Y_a, Z_a)^T$ can be calculated by the following equations:

$$W^L = M_L(X_a Y_a Z_a 1)^T \quad (4)$$

$$W^R = M_R(X_a Y_a Z_a 1)^T \quad (5)$$

where $W^L = (s_L u_a^L, s_L v_a^L, s_L)^T$ and $W^R = (s_R u_a^R, s_R v_a^R, s_R)^T$ and $s_L$ and $s_R$ are scale parameters which are given by $s_L = Z_L$ and $s_R = Z_{RO}$.

The characteristic feature of the above expression is that a calculation amount is reduced by recasting the estimation of unknown parameters as a linear estimation problem. In this embodiment, a large number of feature point data obtained at one image-pickup positionare obtained on the basis of equations (4) and (5), and image-pickup parameters (camera position, pose, base length, vergence angle, focal length, and the like) are estimated by a method of least square or a Kalman filter. Estimation of image-pickup parameters by $\alpha_L$, $\beta_L$, $\gamma_L$ and $\alpha_0$, $\beta_0$, $\gamma_0$ is referred to as extraction of left camera reference image-pickup parameters hereinafter. In the present invention, the process of extracting image-pickup parameters is not limited to the method described above.

Figure 4:
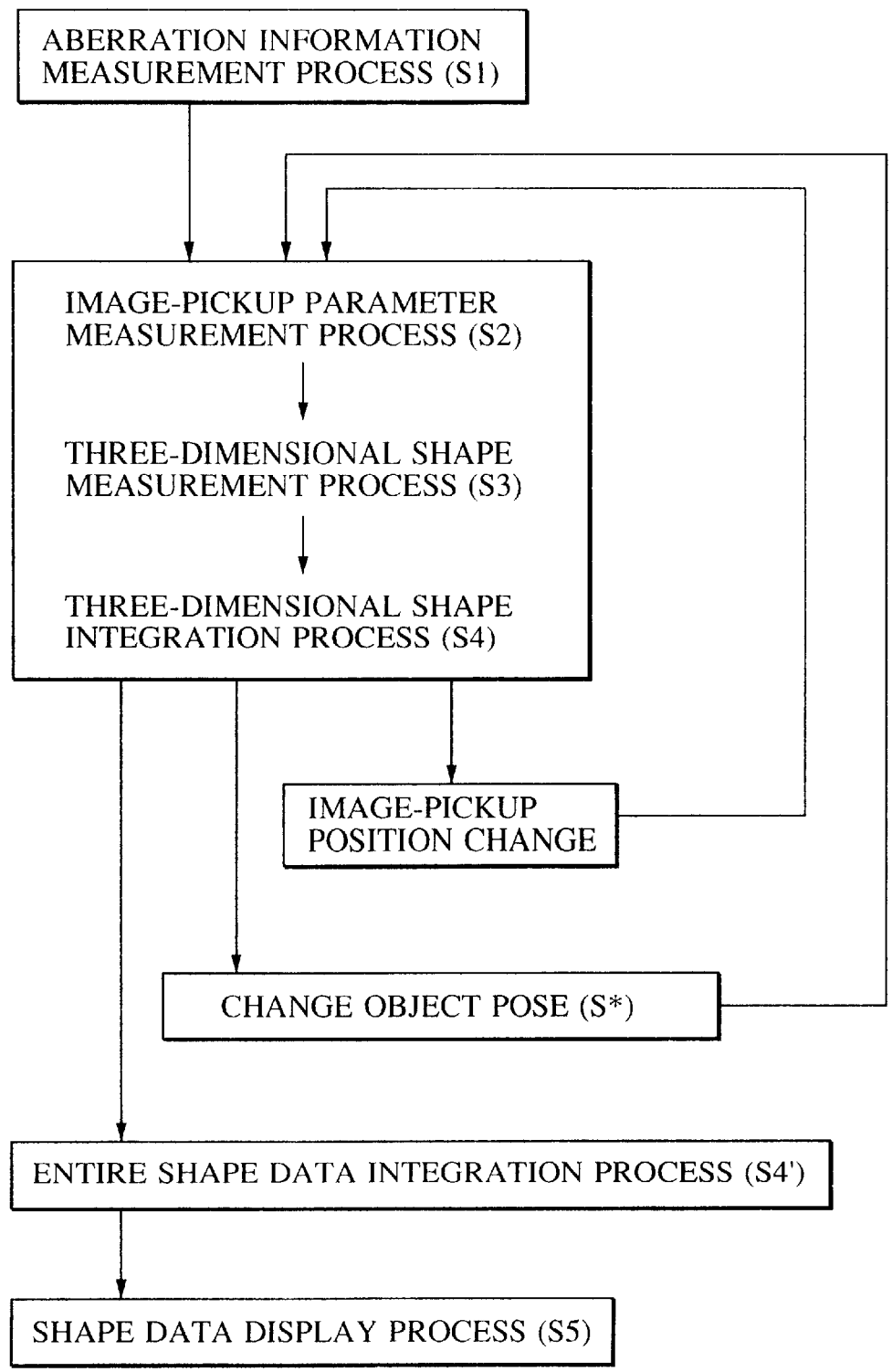
FIG. 4 is a flow chart of an entire process of this embodiment.

FIG. 4 shows a process flow of a main image measuring operation. The outlines of respective processes are described below.

Aberration information measurement process (S1) of the image-pickup system is to measure the distortion of a lens. In the present invention, the distortion is measured using a feature pattern 2 having a known positional relationship and amethod by a known image processing (e.g., IEEE journal of Robotics and Automation, vol. RA-3, pp. 323–344, 1987, or IEEE Proceedings of International Conference on Pattern Recognition. 1990, pp. 246–253) (in this case, the focal lengths of the left and right cameras may also be measured). In this stage, an image-pickup operation is not necessarily performed in such a manner that the object 3 and the known pattern 2 are set within the same field of view.

Figure 5:
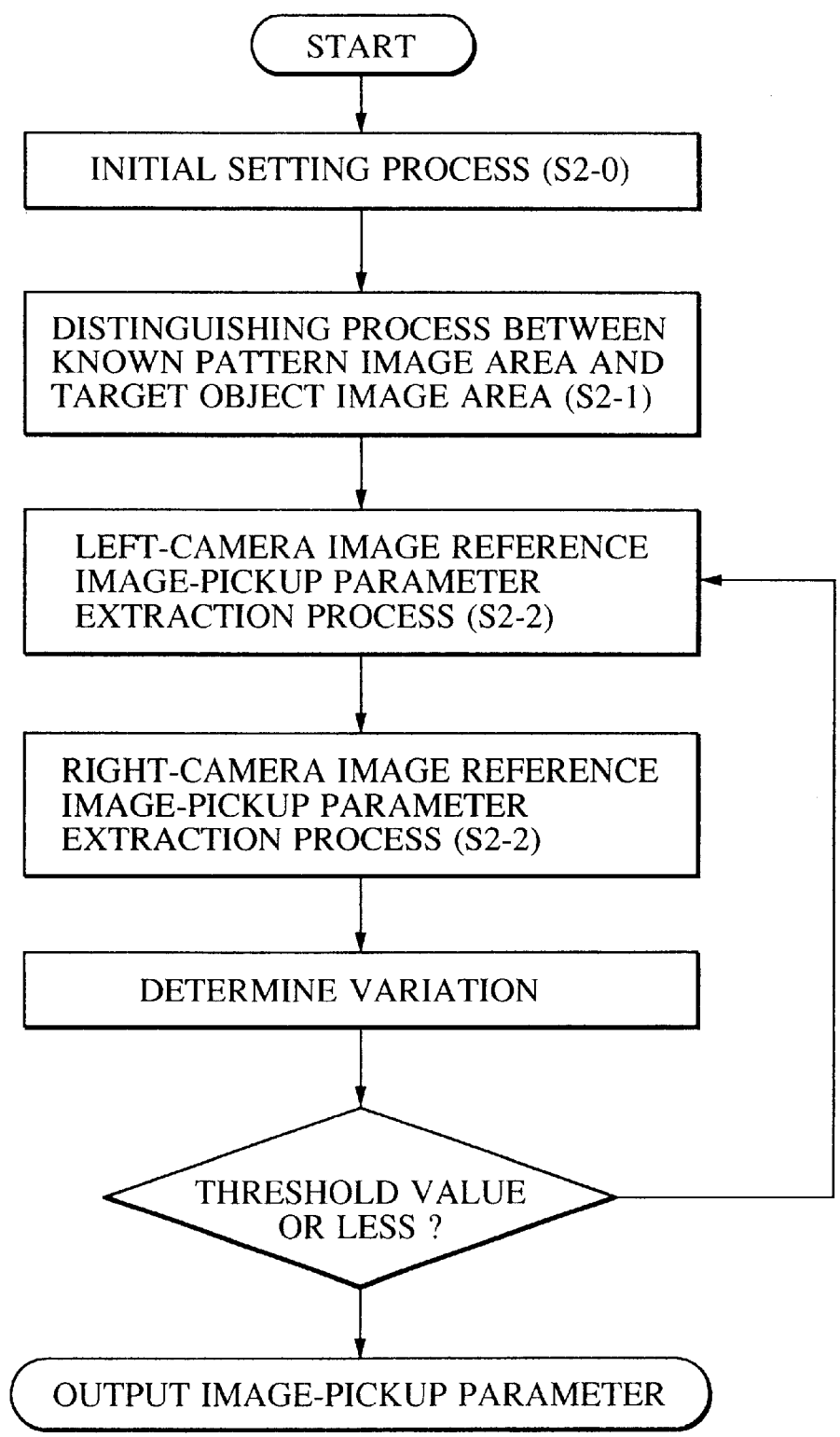
FIG. 5 is a flow chart of an image-pickup parameter extraction process.

FIG. 5 shows the flow of image-pickup parameter measurement process (S2 in FIG. 4). In this case, the known pattern 2 and the object 3 are photographed, and image-pickup parameters (camera position, pose, base length, vergence angle, focal point position, and the like) are estimated by using a method of least square or a Kalman filter on the basis of equations (4) and (5). A measurer properly keeps a field of view while checking an object image with the monitor 5 (e.g., both the objects are simultaneously set at a predetermined base length and a predetermined vergence angle in the same field range) to photograph the objects. In this manner, image-pickup parameters are reliably extracted.

First, as initial setting process (S2-0), control of a base length and a vergence angle or zooming is performed on the basis of an in-focus state signal from an optical distance measurement means, arranged on each of the left and right cameras $1_L$ and $1_R$, for determining an in-focus state, or other rough object distance information, and an obtained image is stored in a image storage means 11 as a still image or a moving image.

A distinguishing process between a known pattern image area and an object image area in the image is performed (S2-1). In this embodiment, for description, as a known pattern, a colored dot pattern in which colored dots (respectively having different hues) arranged at a predetermined distribution density on a planar plate to form a plurality of concentric circles as shown in FIG. 2A is used. Process (S2-1) is performed to cutout a colored dot pattern area from the image of the object 3 placed on the flat plate. In this case, the underlying color or brightness of the known pattern is set to be different from the average color and brightness of the object 3, and the cutting process is performed by using a region growing method or the like on the basis of the color or brightness level. Although the cutting process is not limited to this method, the cutting process is performed by using one of the structural features, average hue, and average brightness of each pattern element (dot, in this case) which is different from the corresponding attribute of the object 3 as a matter of course. Before the cutting process, a process of selecting an optimum attribute may be performed on the basis of the results obtained by measuring these attributes.

In process step (S2-2), a reference point is set in the known pattern area, and a reference coordinate system for extracting image-pickup parameters and partially three-dimensional shape data is set by using the reference point as an origin according to a predetermined method. For example, a coordinate system ($X_i$, $Y_i$, $Z_i$) at the ith image-pickup position may be determined such that a $Y_i$ axis is set to extend from the origin to the center of the concentric circles, an $X_i$ axis is set to be perpendicular to the $Y_i$ axis on a plane, and a $Z_i$ axis is set to be perpendicular to the $X_i$ and $Y_i$ axes and to be a right-hand system. Image-pickup parameters are extracted by using a plurality of feature points in the known pattern image areas in the images of the left and right cameras. In this case, measurement data from the base length adjusting means, the vergence angle adjusting means, and focal length adjusting means may be used as initial values used when the image-pickup parameters are estimated. Fixed parameters may be used as fixed ones to estimate other parameters (especially, the position and pose of the image-pickup means).

In this embodiment, after estimation of image-pickup parameters with reference to the left-camera image is performed, estimation of image-pickup parameters with reference to the right-camera image is performed by using, as initial values, the image-pickup parameters obtained with reference to the left-camera image, or the above processes are repeated until a variation in estimation value becomes a threshold value or less. The processes are to improve accuracy and test the estimation value, and the order of the processes is not limited to a specific order. In order to stably and reliably perform step (S2-1), the known pattern area should preferably have features different from those on the object 3 (e.g., different in hue, reflectance, spatial frequency, or the like).

In image-pickup parameter recording process (S2-4), image-pickup parameters corresponding to object image data are recorded on a recording medium (not shown) such as a (magneto-optical) magnetic disk or a magnetic tape of the predetermined storage means 12 together with image data in a predetermined format in which the correspondence of these image-pickup parameters is clear.

FIGS. 6 and 7 show recording formats of this embodiment. In FIG. 6, image-pickup parameters of subsequent image data and the address of the corresponding image data are written in a header section, and left and right image data corresponding to one image-pickup parameter are sequentially written in a data section. In FIG. 7, a header section in which image-pickup parameters and image data amount (if necessary) are recorded immediately before each image data is present. The image data may be compressed by a proper method. In the header section, associated attribute information other than the image-pickup parameters, i.e., a date, a measurement site, the name of a measurer, the type of an object, or the like may be recorded. Even if the process steps (S1) and (S2) are performed in reverse order, or repeated, the effect of this embodiment is not lost.

Figure 8:
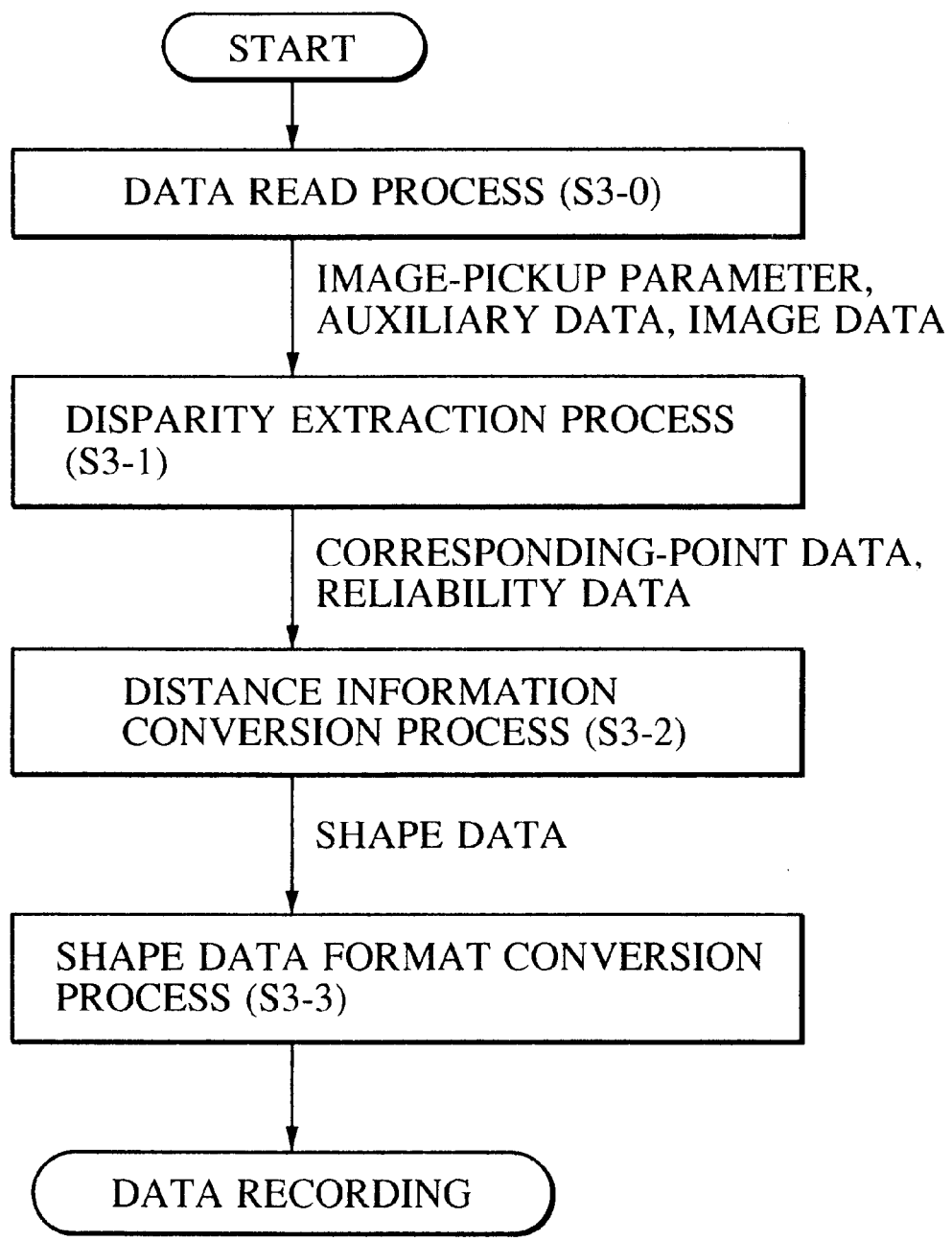
FIG. 8 is a flow chart of a three-dimensional shape data extraction process.

FIG. 8 shows the flow of three-dimensional shape measurement process (S3 in FIG. 4). Process (S3-0) is a process of reading image data and attribute information (including image-pickup parameters) from the image storage unit 11. Inter-corresponding-point disparity extraction process (S3-1) of the left and right images of the object 3 from the binocular camera 1 under the image-pickup conditions as those in process (S2) and distance information (e.g., a Z-axis coordinate value of a camera coordinate system) extraction process (S3-2) of each point based on the image-pickup parameters obtained in process (S2). Although processes (S3-1) and (S3-2) may be performed by using known methods, the reliability of corresponding points is also calculated in process (S3-1).

For example, as the reliability, the following values may be used. That is, when block division is performed in process (S3-1), and corresponding points are extracted on the basis of a correlation value between the left and right image blocks, the correlation value between the blocks may be used as the reliability. A predetermined functional value which is defined on the basis of an assumption of disparity continuity and set to be decreased as a degree of discontinuity of disparity increases is used as the reliability. In addition, a predetermined functional value (decreases as the corresponding point comes closer to an occluding edge) determined depending on the distance between the corresponding point and an occluding edge detected by a predetermined method may be used. In this manner, the reliability is set on the assumption that no corresponding point is present near the occluding edge. Furthermore, the reliability is not limited to the above values, and a compound function constituted by a plurality of reliability parameters may be used.

In this embodiment, by using a predetermined method (e.g., a feature point near the center of the overlapping area between the left and right images), a reference point is extracted from the known pattern 2 in the image obtained at each image-pickup position. A partial three-dimensional shape of the object 3 is obtained in an orthogonal coordinate system (the same setting method as that of the reference coordinate system used in the description in FIGS. 2A and 2B and FIGS. 3C and 3D) having the reference point as an origin. In addition, the partial three-dimensional shape data and, corresponding image-pickup parameters are recorded in a predetermined storage means (medium) in the same format as described above (S3-3). However, in the present invention, the type of the storage means (medium) is not limited to a specific type.

Figure 9:
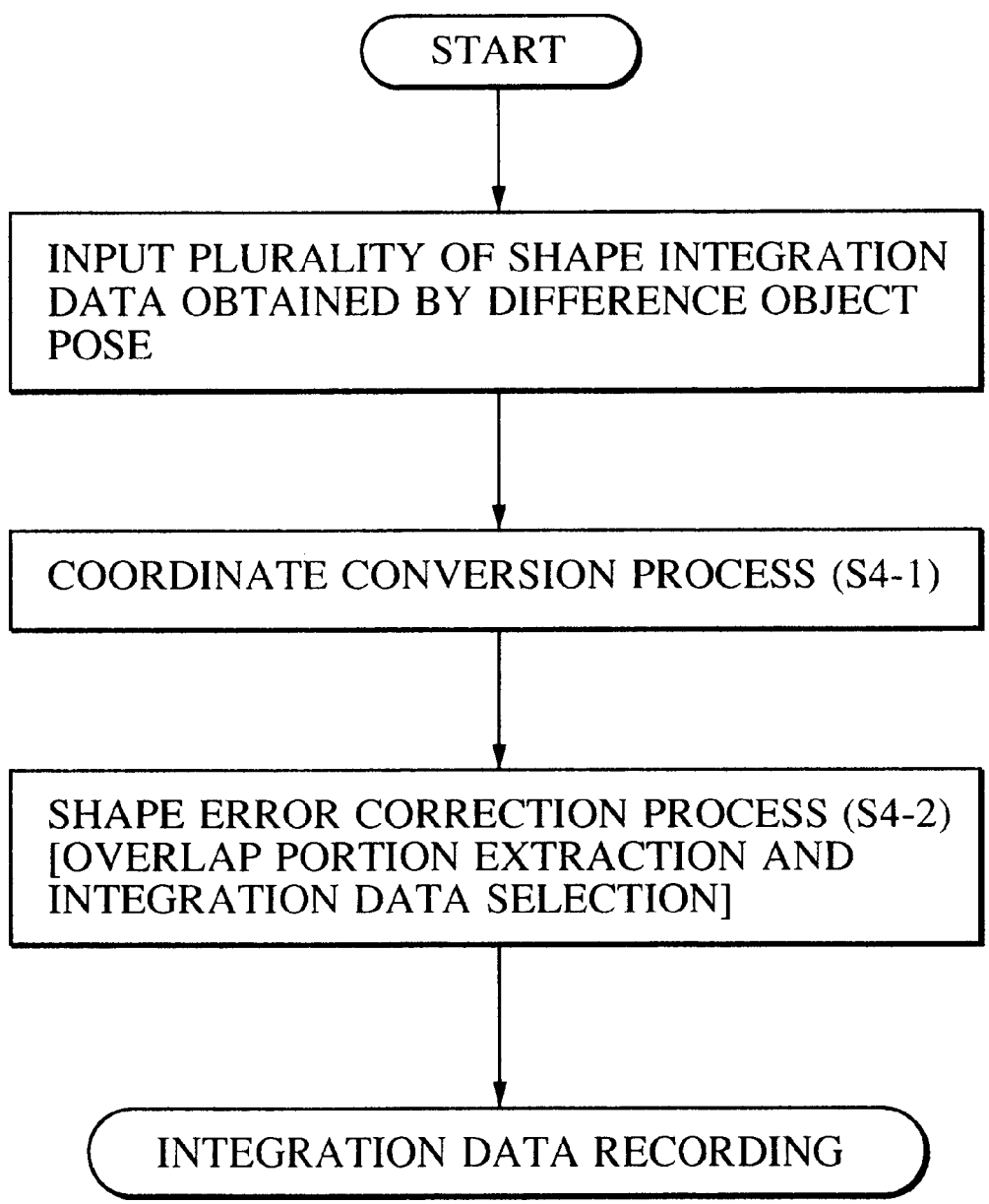
FIG. 9 is a flow chart of a partial shape data integration process.

FIG. 9 shows the flow of three-dimensional shape integration process (S4 in FIG. 4). In three-dimensional shape integration process (S4), the plurality of partial three-dimensional shape data of the object 3 obtained at different image-pickup positions are connected to each other at a high accuracy through the reference points set in process (S3) to be integrated. Since the positions of the reference points and the directions of the axes on the absolute coordinate system (initially set reference coordinate system) are known, when the three-dimensional shape data are integrated on the absolute coordinate system, the following coordinate conversion process (S4-1) is performed to each data:

$$P = R_L(i)^{-1}(C_i - T_L(i)) \qquad (6)$$

In the above equation, $C_i$, $R_L(i)$, and $T_L(i)$ represent parameters at the ith image-pickup position. These parameters represent shapes corresponding to images on the left-camera coordinate system, i.e., the three-dimensional position (vector) at each data point, a rotation matrix for the absolute coordinate system of each coordinate axis, and the position (vector) of an origin, respectively (although the parameters for the right-camera coordinate system can be calculated in the same manner as described above, the parameters for only one of the left- and right-camera coordinate systems may be used). Furthermore, as shape errorcorrection process (S4-2), any one of the three-dimensional data between overlapping areas between the partial three-dimensional shape data in integration process is selected on the basis of the reliability calculated in process (S3). For example, when grating point coordinates obtained by quantizing (X, Y, Z) coordinate values in a predetermined quantization size coincide with each other, it is considered that an overlapping portion is present. In this case, process (S4-2) is applied, and one of the coordinate values before quantization may be selected. The overlap determining method is not limited to the above method as a matter of course. Although either reliability may be used if the reliability satisfies predetermined standards, the reliability having a higher value is basically selected. The shape data integrated as described above is recorded on the data storage means 12.

In shape data displaying process (S5 in FIG. 4), the three-dimensional shape data is read from the shape data storage means 12, display data to be displayed on the monitor 5 is generated by a method such as a wire frame method. As other displaying methods, images from the left and right cameras may be synthesized with each other to generate a panoramic display, or images from the left and right cameras may be stereoscopically displayed on a head mounted display (binocular display) with disparity distribution.

In this embodiment, since a three-dimensional shape including the bottom surface of the object 3 that is arranged nearby cannot be extracted by only placing the object 3 on a planar plate, after the processes up to process (S3) are performed within a measurable range, for example, the object 3 is placed on the known pattern upside down, and the processes from process (S*) to process (S3) may be performed. In this case, when integrated shape data obtained up to process (S4) are to be finally integrated, these shape data especially desirably overlap. As a method of finally integrating the plurality of integrated shape data into an entire three-dimensional data, the following method may be used. That is, with reference to one integrated shape data, the coordinate conversion process (S4-1) is performed to other shape data on the absolute coordinate system by using various parameter values, a process of determining a degree of overlapping between these shape data is performed, and coordinate conversion having the highest degree of overlapping is employed to select one of the overlapping portions. The following method may also be used. That is, feature points are extracted in the overlapping area in advance, and the coordinate conversion (S4-1) parameters which realize position alignment of shape data having matched feature points are calculated.

Embodiment 2

Figure 10:
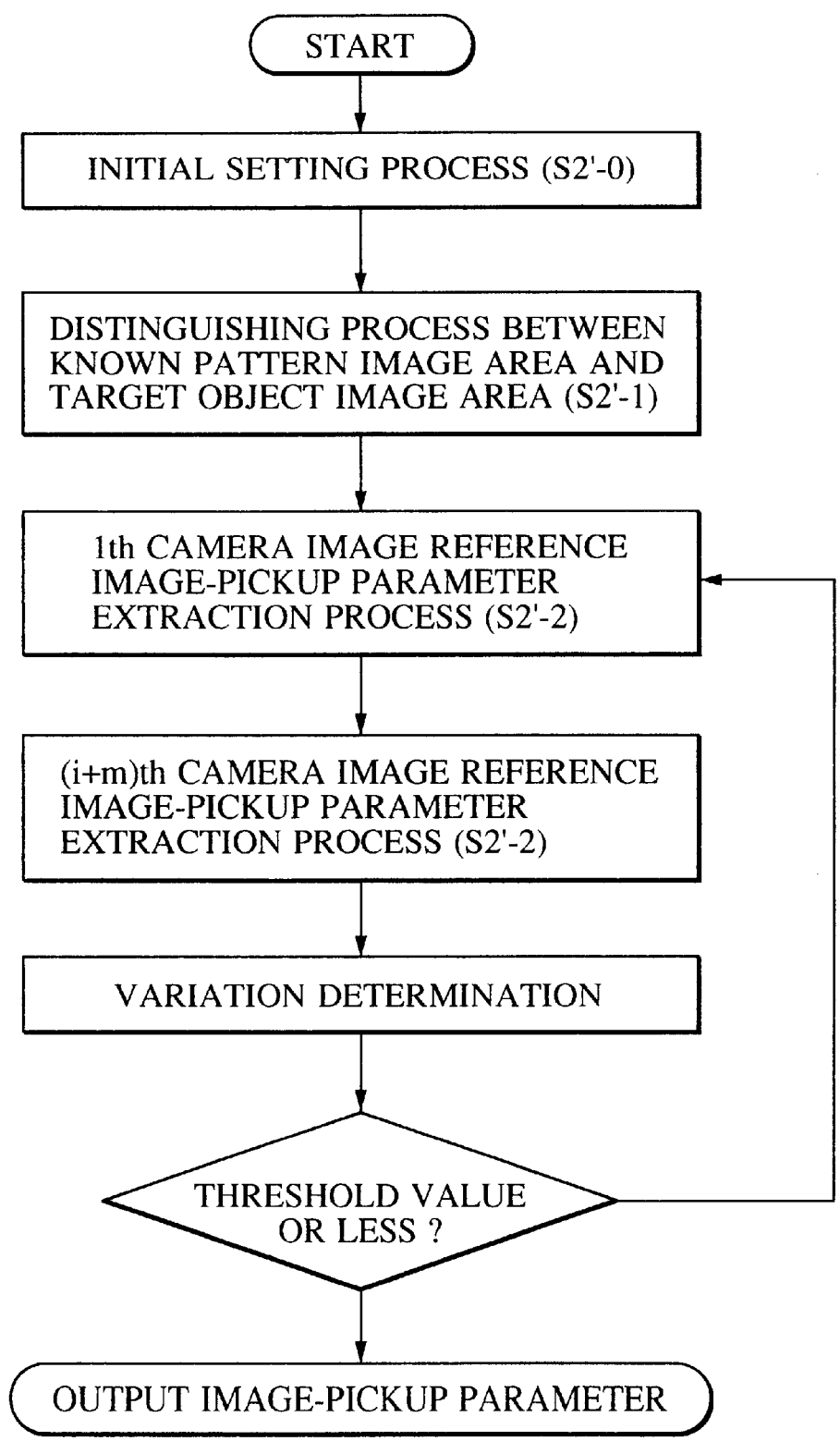
FIG. 10 is a flow chart of an image-pickup parameter extraction process according to Embodiment 2.

FIG. 10 is a flow chart of an image-pickup parameter extraction process in Embodiment 2. Respective steps in FIG. 10 correspond to those in FIG. 5 of Embodiment 1.

This embodiment has the same arrangement as that of Embodiment 1 except that an image-pickup means is a single-eye camera. In this case, by using images obtained at ith and (i+1)th (or (i+k)th; k≠1) image-pickup positions where the images of a known pattern and an object are present to overlap, an image-pickup parameter extraction process and a three-dimensional shape extraction process based on the image-pickup parameters are performed. In this embodiment, a plurality of feature point data are given, and parameters are calculated by using a matrix $M_i$ defined by the following equation:

$$M_i = \begin{pmatrix} k_u f_i & 0 & 0 & u_0^i \\ 0 & k_u f_i & 0 & v_0^i \\ 0 & 0 & 1 & 0 \end{pmatrix} \begin{pmatrix} R_i & T_i \\ 0_3^T & 1 \end{pmatrix}$$

as solutions $M_i$ and $M_{i+m}$ which are obtained by solving the following equations:

$$W^i = M_i(X_a Y_a Z_a 1)^T \qquad (7)$$

$$W^{i+m} = M_{1+m}(X_a Y_a Z_a 1)^T \qquad (8)$$

by a method of least square or a Kalman filter.

However, the same repetitive process as in Embodiment 1 is not performed, and only one parameter may be calculated by the method of least square, and the other may be calculated by the Kalman filter. In this case, m is an integer number (≠0), $W^i = (s_i u_a^i, s_i v_a^i, s_i)^T$, $s_i$ is a scale parameter ($s_i = Z_i$), and $Z_i$ is a Z-coordinate value on a camera coordinate system at the ith image-pickup position. A sensor means such as an acceleration sensor or a gyro may be mounted on the image-pickup means to detect a self movement parameter, and the parameter may be used to set the initial values of position and pose parameters in estimation of image-pickup parameters. As in this embodiment, extraction of image-pickup parameters using a handy single camera which is smaller than a binocular camera in size, and extraction and integration of three-dimensional shape information of the object based on the image-pickup parameters are performed.

Embodiment 3

Figure 11A:
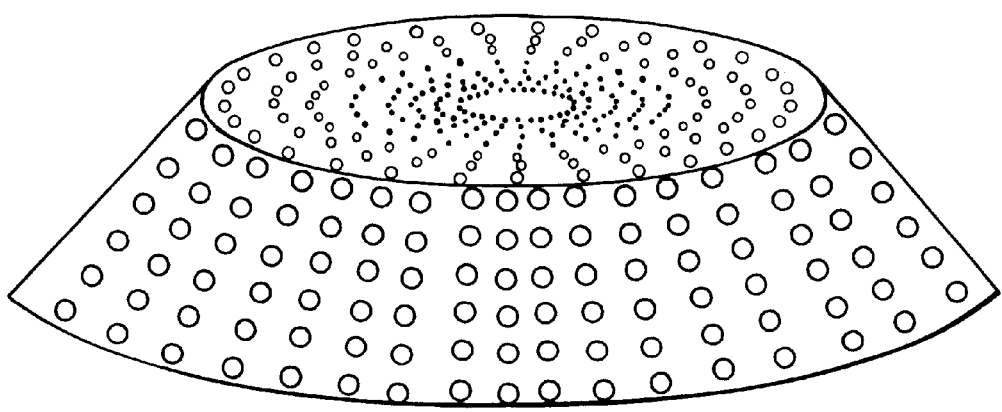
FIGS. 11A and 11B are views for describing image-pickup parameter extracting objects with known patterns having known shapes used in Embodiment 3.
Figure 11B:
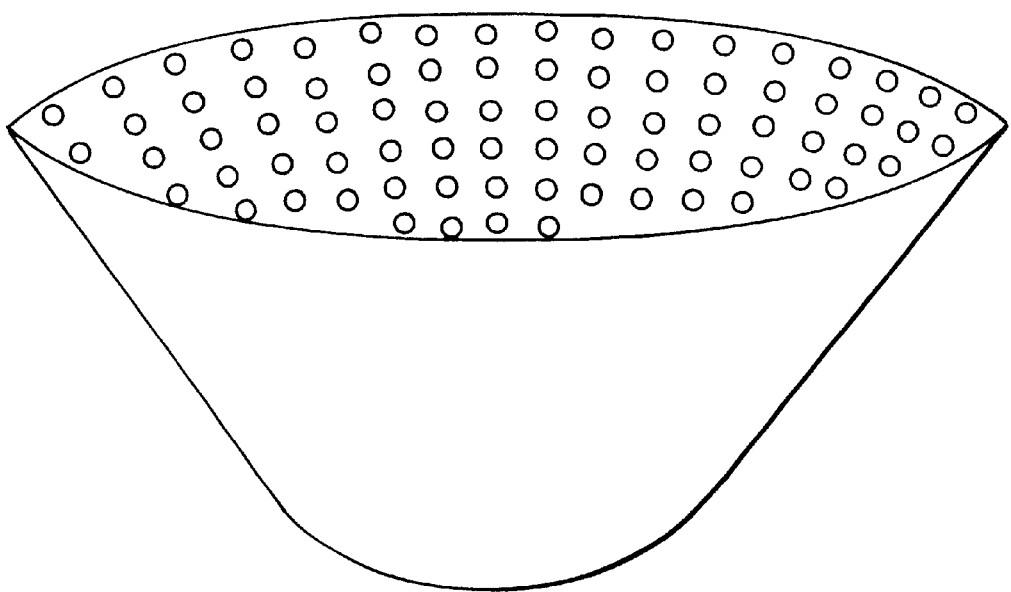

FIGS. 11A and 11B are views for describing a non-planar object having a known shape, and a feature pattern which is arranged on the surface of the object and has features which can be identified and whose positional relationship is known.

FIG. 11A shows a case wherein a known feature pattern is formed on a conical table, and FIG. 11B shows a case wherein a known pattern is formed on the inner surface of a bowl-like object. When the known pattern is arranged on a non-planar surface as in this embodiment, the ranges of an image-pickup position and a pose where image-pickup parameters are extracted can be extended without changing a manner of placing an object having an unknown shape. In addition, prevention of a degeneracy solution or the like is performed in an image-pickup parameter extraction process (S2 in FIG. 4), thereby realizing improvements in stability and accuracy.

Embodiment 4

Figure 12:
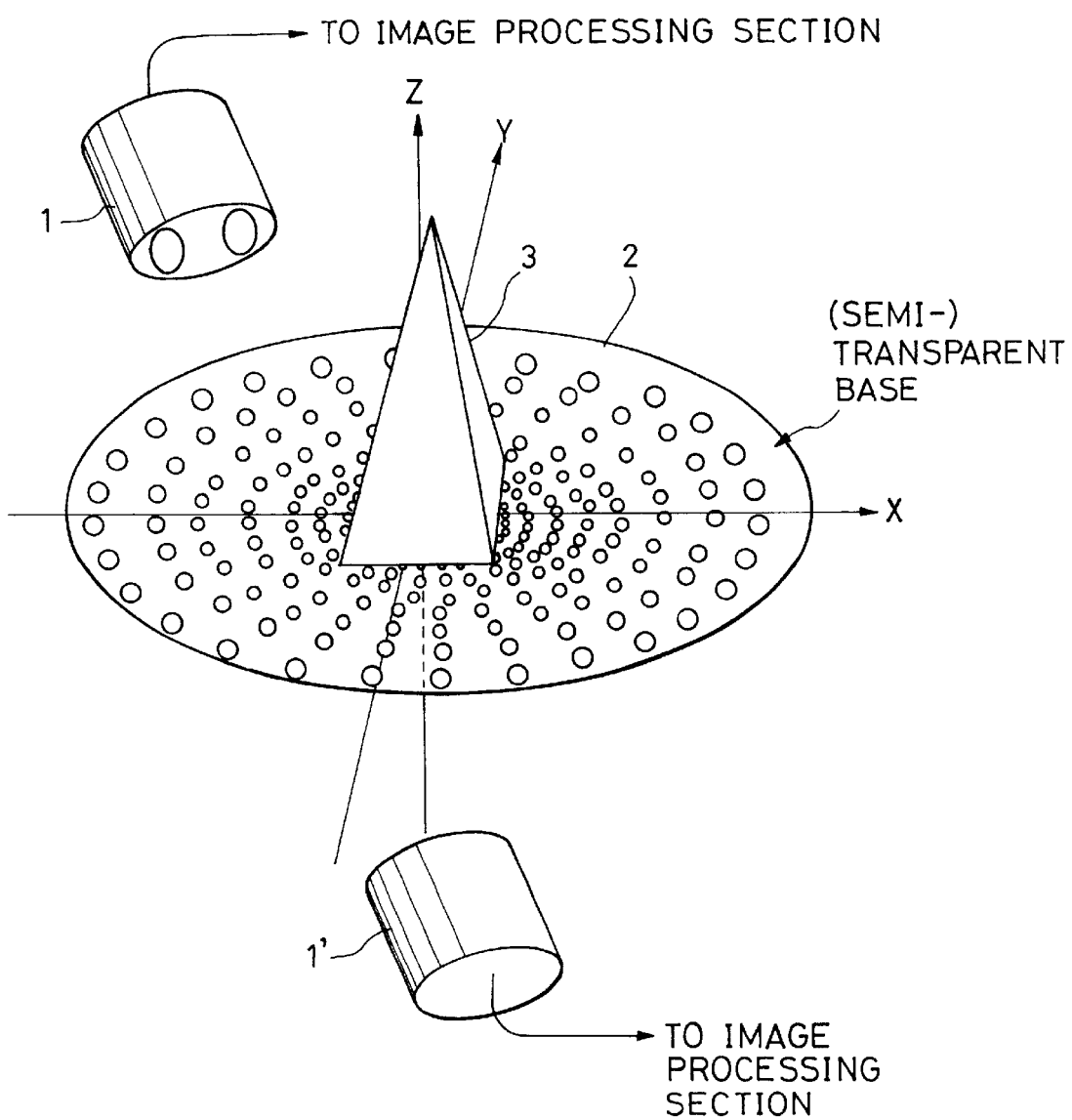
FIG. 12 is a view showing the arrangement of a pattern and an image-pickup means when a known (semi) transparent pattern is used in Embodiment 4.

FIG. 12 is a known pattern used in Embodiment 4. Referring to FIG. 12, a feature pattern having features whose positional relationship is known is formed on a semi-transparent base. This embodiment is characterized in that the base on which the object 3, having an unknown shape, is placed can be photographed. In this embodiment, when the feature pattern on the semi-transparent base is used, an image-pickup position is placed within a range larger than that in Embodiment 3.

In this embodiment, it is desirable that the known pattern is not present on a tangent plane of the object 3. The (spectral) reflection characteristics of the front and rear surfaces of the base are desirably made different from each other, or the attributes of the known pattern on the front and rear surfaces are desirably made different from each other.

The shape of the object 3 near its bottom surface which cannot be covered by the embodiment described above or partial shape data which can only be obtained by an image-pickup operation from the lower side of the object 3 can be obtained together with the position and pose data of the image-pickup means. Therefore, the processes such as the process of changing the pose of the object 3 and the processof aligning the positions of a plurality of integrated data which are performed in the previous embodiment become unnecessary, and the entire shape of the object is obtained in fewer calculation steps.

Embodiment 5

Figure 13:
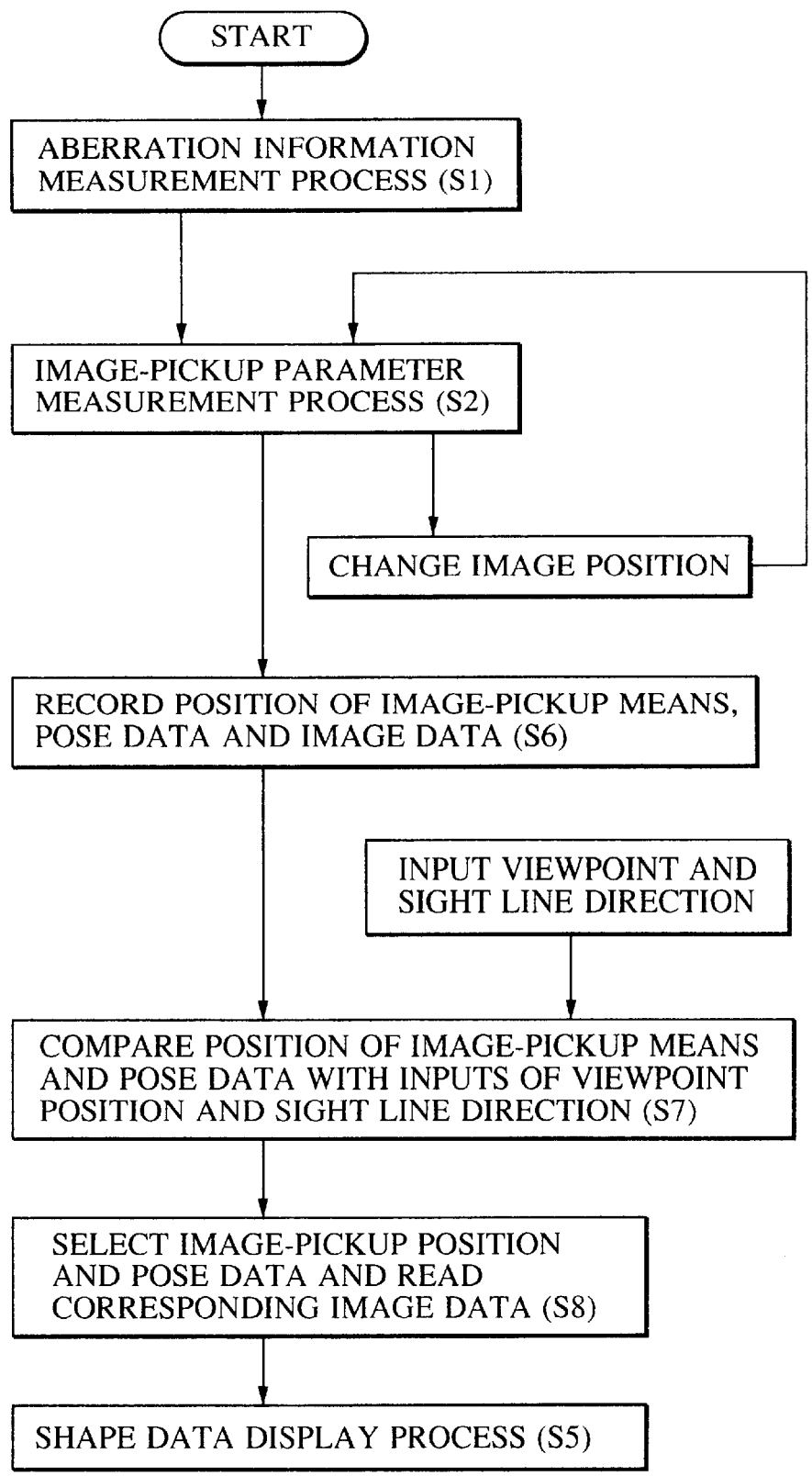
FIG. 13 is a flow chart of an entire process when the position and pose of an image-pickup means are extracted by using a known pattern in Embodiment 5 to be used in image reproduction.

FIG. 13 shows the main process flow in Embodiment 5. Image-pickup parameter extraction process (S2 in FIG. 4) in this embodiment is performed in the same manner as in Embodiment 1 except that a known pattern is used mainly to extract the position and pose parameters of a image-pickup means. However, in this embodiment, extraction and integration of three-dimensional shape data are not performed, and two-dimensional images corresponding to the position and pose of the image-pickup means are recorded on a storage means 12 (S6).

In this case, the process of segmentation/cutting out the known pattern and the object image from each other may be performed, and only the object image may be recorded on the predetermined storage medium together with a viewpoint position. In reproduction, a process (S7) of comparing a viewpoint position designated by a user with the image-pickup position and pose, and an image having, as auxiliary information, image-pickup parameters (in this case, the position and pose data of the image-pickup means) obtained when the parameters coincides with each other or are very similar to each other is called from the shape data storage means 12 (S8), and the image data is converted to display data suitable for a display (S5).

For example, a two-dimensional image from one camera may be displayed, images from the left and right cameras are synthesized to perform a panoramic display, or images from the left and right cameras may be stereoscopically displayed on a head mounted display (binocular display) with disparity. In order to smoothly reproduce object images from arbitrary viewpoint positions with almost the same sizes, an image-pickup operation and a recording operation are desirably performed while the distance between the object and the image-pickupmeans is kept as constant as possible. For this purpose, the image-pickup means on which no focal length adjusting means is arranged is desirably used, and, especially, in a binocular camera, a base length and a vergence angle are desirably fixed. However, the following process or the like must be performed. That is, an optical distance measurement means for determining an in-focus state is arranged to control the system so as to prevent an image-pickup operation and parameter extraction from being performed in an out-of-focus state.

In Embodiment 5, the position and pose of the image-pickup means are stably extracted at a high accuracy from only an image as described above. For this reason, the means according to Embodiment 5 can be used as a simple image-pickup recording/reproducing means which picks up the image of an object at various angles to reproduce an object image from an arbitrary viewpoint position designated by a user.

Embodiment 6

Figure 14:
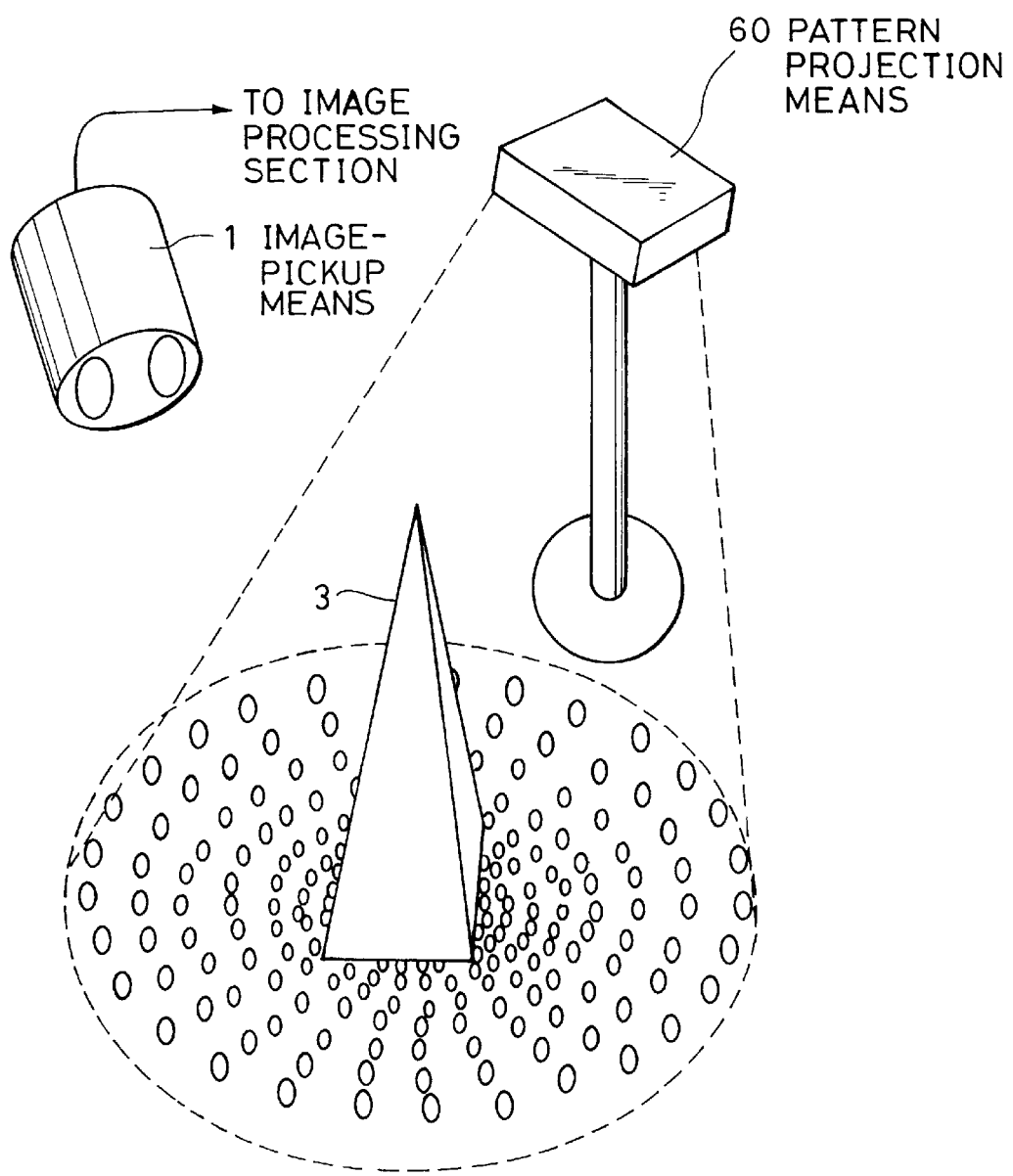
FIG. 14 is a view showing the arrangement of a system portion when an auxiliary projection means is used in Embodiment 6.

FIG. 14 is a view showing the arrangement of Embodiment 6. A projection means 60 in FIG. 14 projects a structure pattern at a predetermined angle on a non-textured plane and an object 3 placed thereon. As a pattern to be projected, a pattern obtained by arranging dots, gratings, or two-dimensional feature pattern elements at a predetermined distribution density as shown in FIGS. 2A and 2B and FIGS. 3A and 3B may be used. On the object, the projection pattern has a distribution density or a distribution to reflect the shape of the object. Therefore, image-pickup parameters are extracted by using a regularly structured patternon the plane from images obtained by performing an image-pickup operation at image-pickup positions, and a rough three-dimensional shape is calculated from only the projection pattern on the object surface by using a known method ("Three-dimensional Image Measurement" by Iguchi and Sato; Shokodo, 1990). In addition, corresponding points (disparity) of the left and right images including the projection pattern are extracted (so-called stereo image measurement) by using a binocular camera as an image-pickup means, so that a three-dimensional shape data having a high density and a high accuracy is obtained.

In this embodiment, in particular, when the rough shape data using a projection pattern is used as initial shape data in stereo image measurement, shape data of an object whose surface is without textured patterns is extracted. For example, the shape data of points other than feature points are formed from the initial shape data by an interpolation process, and the upper or lower limit of corresponding points searching range or a disparity value in the stereo image measurement are set by using the shape data, so that three-dimensional shape data can be extracted at a high speed.

If a pattern is not projected by one projection means depending on an image-pickup position, a plurality of projection means may be arranged around the object, and the projection means may be switched to each other in accordance with an image-pickup position. A table on which the object 3 is placed need not have a planar surface, and may have a known shape. However, the surface of the table is desirably non-textured, if possible.

Embodiment 7

In Embodiment 7, when the shape of an object 3 is partially known in advance, a known pattern formed on a predetermined sheet is attached to the object 3, and the known portion and a portion having an unknown shape are photographed, within the same field of view. Image-pickup parameters are extracted from the observed feature points. In addition, a known three-dimensional shape portion is extracted on the basis of the image-pickup parameters in the same manner as in Embodiment 1.

When partial shapes are to be obtained by changing image-pickup positions, a pattern is attached to a portion having a known shape data present in an image obtained at the image-pickup position, and the same processes as described above are repeated. In this embodiment, the object 3 is desirably constituted by a smooth surface, i.e., a planar surface or a curved surface having a small curvature.

According to Embodiment 7, the three-dimensional shape of an object is simply extracted although the object has a relatively large size.

Embodiment 8

In Embodiment 8, a binocular image-pickup means (not shown) includes two eyes respectively having different fixed focal lengths. A main controller 10 controls the image-pickup means such that one eye is used to acquire a known pattern image and the other eye is used to acquire the image of an object having an unknown shape.

The remaining arrangement of Embodiment 8 is the same as that of Embodiment 1. In this manner, an error of image-pickup parameters or three-dimensional shape data caused by one blurred image obtained when an unknown-shape object and a known pattern are photographed within the same field of view is suppressed. In this embodiment, the same image-pickup parameter extraction process as that in Embodiment 2 is performed.

What is claimed is:

1. An image processing method characterized in that sensing an object with a predetermined image pattern whose shape and position are known from a plurality of viewpoint positions, extracting image data corresponding to the predetermined image pattern and operating parameters concerning image sensing positions and image sensing directions by detecting a change of the predetermined image pattern in the image data, and producing a three-dimensional image of the object sensed from an arbitrary viewpoint by using the image of the object sensed from the plurality of viewpoint positions and the parameters concerning image sensing position and image sensing direction.

2. An image processing method according to claim 1, characterized in that the predetermined image pattern is present on an object whose shape is at least partially known.

3. An image processing method according to claim 1, wherein the known pattern is constituted by a plurality of patterns respectively having features which are different from each other.

4. An image processing apparatus according to claim 1, wherein the known pattern is aligned such that attributes of features of a shape and an image change according to a predetermined rule.

5. An image processing method characterized in that sensing a predetermined image pattern having features which are known is defined as a first object, and a predetermined object is defined as a second object, and outputting an image comprising both of a first image and a second image corresponding to the first object and the second object, respectively, and extracting parameters concerning image sensing positions and image sensing directions of image sensing means by extracting the first image from the image comprising both the first and second images and detecting a change of the first images in the first images of the first object from a plurality of viewpoint positions, and producing a three-dimensional model image of the second object sensed from an arbitrary view position by using the second images sensed from the plurality of viewpoint positions and the parameters concerning image sensing positions and image sensing directions of image sensing means corresponding to the second images.

6. An image processing apparatus comprising:
   input means for inputting images respectively sensed both of a first object image whose shape and position are known and a second object image having a three-dimensional shape which is at least partially unknown, and each of which is obtained by viewing at a plurality of viewpoint positions;
   parameter extracting means for operating parameters concerning image sensing positions and sensing directions by extracting the first object image from the image input by said input means and detecting a change of the first object image;
   three-dimensional shape information extracting means for extracting three-dimensional shape information of the second object on a basis of the parameters;
   recording means for recording the second object images at a plurality of viewpoint positions and the three-dimensional shape information corresponding to the second object images respectively; and
   image display means for displaying a three-dimensional image viewed from one of said arbitrary positions by synthesizing the plurality of the second object images on the basis of the three-dimensional shape information and one of said arbitrary positions.

7. An image processing apparatus according to claim 6, wherein said input means includes image-pickup means for photographing an object and storage means for storing an image.

8. An image processing apparatus according to claim 7, wherein said image-pickup means has a plurality of optical paths whose fixed focal lengths are different from each other, one optical path is used to acquire the first object image, and the other optical path is used to acquire the second object image.

9. An image processing apparatus according to claim 6, wherein said three-dimensional shape information extracting means includes a reference coordinate system setting means having a predetermined point on the first object as an origin and a three-dimensional shape information extracting means for the second object in the reference coordinate system.

10. An image processing apparatus according to claim 6, wherein the first object is constituted by arranging light-emitting elements in a predetermined pattern.

11. An image processing apparatus according to claim 4, wherein the features of the image are a continuous change in hue, picture pattern, and image pattern.

12. An image processing apparatus according to claim 11, wherein the known pattern has portions which are different from each other in the hue, picture pattern, and image pattern.

13. An image processing apparatus according to claim 4, wherein the pattern is on a conic section or a curve expressed by an n-degree polynomial.

14. An image processing apparatus according to claim 4, wherein a direction of the pattern is in circumferential and radial directions of an ellipse or a circle.

15. An image processing apparatus according to claim 4, wherein the pattern is an n-angle polygon.

16. An image processing apparatus according to claim 4, wherein the rule changes depend on a direction of a pattern wherein the known pattern creeps.

17. An image processing apparatus according to claim 16, wherein, when the pattern is a concentric pattern, attributes change according to different rules in an R (radial) direction and a theta direction, respectively.

18. An image processing apparatus comprising:
   input means for inputting images respectively sensed both of a first object image whose shape and position are known and a predetermined second object, obtained by viewing, at a plurality of viewpoint positions;
   parameter extracting means for operating parameters concerning image sensing positions and sensing directions by extracting from the image input, by said input means, the first object image and detecting a change of the first object image;
   image recording means for recording the second object images at a plurality of viewpoint positions;
   parameter recording means for recording parameters concerning the image sensing positions and sensing directions corresponding to the second object images respectively; and image display means for displaying a three-dimensional image viewed from an arbitrary position by synthesizing the plurality of object images on the basis of the parameters and the arbitrary position.

19. An image processing method comprising:

a step of setting a predetermined point on an image pattern whose shape and position are known as a reference point;

a step of setting a predetermined coordinate having the reference point as a center;

a step of simultaneously sensing an object set on the predetermined image pattern and the image pattern;

a step of extracting a partial three-dimensional shape of the object corresponding to the reference point by using images sensed from a plurality of viewpoint positions to include the reference point;

a step of obtaining a coordinate conversion parameter for performing a conversion of the predetermined coordinate between different reference points by detecting a change of the predetermined image pattern; and a step of producing a three-dimensional model image at an arbitrary viewpoint position by integrating a plurality of partial three-dimensional shapes of the object obtained at the different reference points on a basis of the coordinate conversion parameter.

20. An image processing method according to claim 19, wherein, in a process of extracting parameters by using the plurality of images obtained from the plurality of viewpoint positions, as the parameters, the parameters being extracted with reference to the other viewpoint position by using parameters extracted with reference to one viewpoint position to estimate reliability of the parameters obtained with reference to the viewpoint positions.

21. An image processing method according to claim 20, wherein the three-dimensional shape of an object whose shape is at least partially unknown by using the parameters obtained by estimating reliability.

22. An image processing method according to claim 19, wherein the three-dimensional extraction process records parameters during photographing of the object, and reads the parameters during extraction of the three-dimensional shape to extract the three-dimensional shape.

23. An image measuring method according to claim 19, wherein the three-dimensional shape extraction process includes a step of recording the parameters and object images in a predetermined format during photographing of the object, and reading an object image having a parameter which is closest to a view point position designated during reproduction of the object images to reproduce the object image.

* * * * *

UNITED STATES PATENT AND TRADEMARK OFFICE
CERTIFICATE OF CORRECTION

PATENT NO. : 6,621,921 B2
DATED : September 16, 2003
INVENTOR(S) : Masakazu Matsugu et al.

It is certified that error appears in the above-identified patent and that said Letters Patent is hereby corrected as shown below:

Title page,
Item [56], References Cited, FOREIGN PATENT DOCUMENTS,
"5303629　　　should read　-- 5-303629
　6208610　　　　　　　　　　6-208610
　6241731　　　　　　　　　　6-241731
　6259536"　　　　　　　　　6-259536 --.

Column 1,
Line 65, "arises." should read -- arise. --; and
Line 67, "positionis" should read -- position is --.

Column 2,
Line 18, "thereis" should read -- there is --;
Line 19, "inthat" should read -- in that --; and
Line 53, "image." should read -- image --.

Column 4,
Line 33, "anglesa" should read -- angles a --; and
Line 64, "firstobject" should read -- first object --.

Column 5,
Line 48, "$1_R$," should read -- $1_R$, --; and
Line 67, "$p_3$," should read -- $P_3$, --.

Column 6,
Line 57, "$u_0^R$," should read -- $v_0^R$, --.

Column 7,
Line 56, "$U_a^{L=(u_a^L, v_a^L)^T}$" should read -- $U_a^L = (u_a^L, v_a^L)^T$ --; and
Line 63, "$s_R v_a^{R,s_R})^T$" should read -- $s_R v_a^R, s_R)^T$, --.

Column 8,
Line 3, "positionare" should read -- position are --.

UNITED STATES PATENT AND TRADEMARK OFFICE
CERTIFICATE OF CORRECTION

PATENT NO.     : 6,621,921 B2
DATED          : September 16, 2003
INVENTOR(S)    : Masakazu Matsugu et al.

It is certified that error appears in the above-identified patent and that said Letters Patent is hereby corrected as shown below:

Column 13,
Line 9, "processof" should read -- preocess of --;
Line 33, "coincides" should read -- coincide --; and
Line 46, "image-pickupmeans" should read -- image-pickup means --.

Column 14,
Line 9, "patteron" should read -- pattern on --.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,621,921 B1
DATED : September 16, 2003
INVENTOR(S) : Matsugu et al.

It is certified that error appears in the above-identified patent and that said Letters Patent is hereby corrected as shown below:

Column 18,
Line 10, "shape of" should read -- shape extraction process extracts a three-dimensional shape of --.

Signed and Sealed this

Twenty-third Day of November, 2004

JON W. DUDAS
*Director of the United States Patent and Trademark Office*